Aug. 27, 1935.                     B. J. SMYTH                     2,012,642
                                    STERILIZER
                                 Filed Oct. 9, 1934
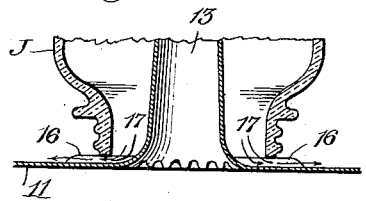
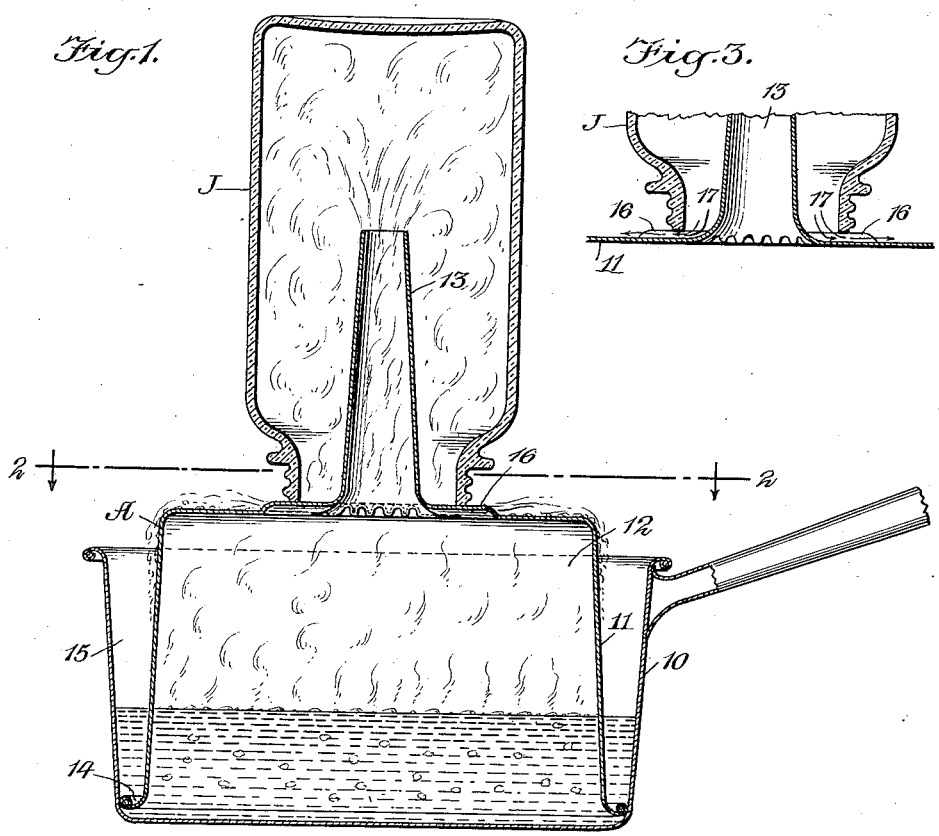
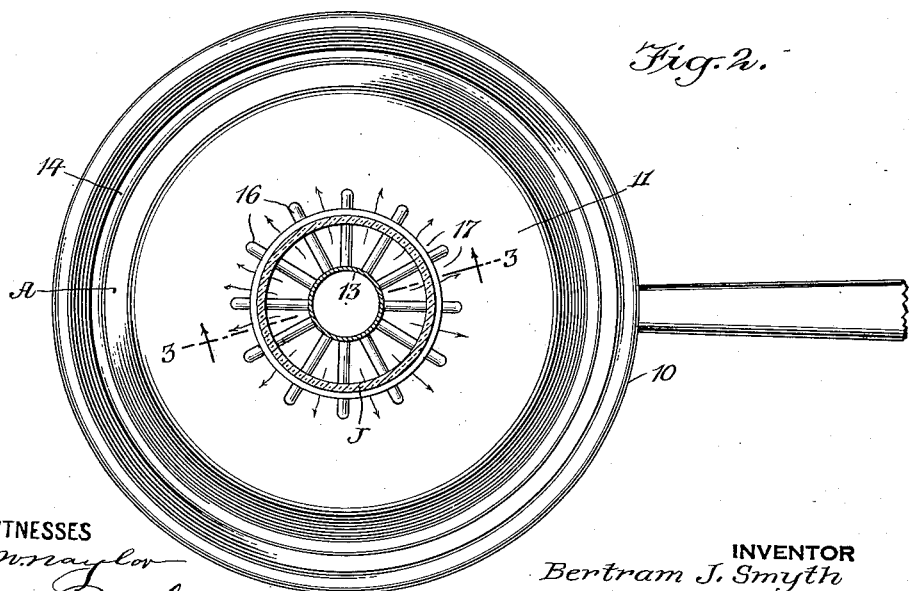
WITNESSES
INVENTOR
Bertram J. Smyth
BY
ATTORNEYS Patented Aug. 27, 1935

2,012,642

UNITED STATES PATENT OFFICE 2,012,642

STERILIZER

Bertram J. Smyth, Oberlin, Ohio

Application October 9, 1934, Serial No. 747,603

1 Claim. (Cl. 141—7)

This invention relates to a device for sterilizing canning jars, bottles, and other analogous vessels or receptacles.

The device is designed and adapted to utilize steam or other vaporous medium for sterilizing the various articles mentioned, and may be used advantageously as a household device for the stated purpose.

An object of the invention is the provision of a device of the indicated character which facilitates the cleaning or sterilizing of articles such as those mentioned.

A further object of the invention is the provision of a simple and inexpensive accessory which may be used in conjunction with an ordinary household article, such as a pan or other similar vessel adapted to contain water to be converted into steam, so that the steam may be used to sterilize or clean various articles when subjected thereto.

The nature of the invention and its distinguishing features and advantages will appear when the following specification is read in connection with the accompanying drawing, in which Figure 1 is a central vertical section of a device embodying the features of the invention in use;

Figure 2 is a sectional view taken on the line 2—2 of Fig. 1;

Figure 3 is a fragmentary section on the line 3—3 of Fig. 2.

In accordance with the invention as illustrated by way of example in the drawing, use is made of a household vessel, such as a pan 10, of any suitable depth adapted to contain water or other liquid which when subjected to heat will be converted into steam. Use is also made of an accessory A in the form of a hollow cover or hood 11 adapted to be arranged within the pan 10 to form or combine therewith, a steaming chamber 12. The cover or hood 11 has steam outlet means in the form of an upstanding projecting tubular tapered member or nozzle 13 centrally thereof and in communication with the chamber 12. The cover or hood on the lower edge portion thereof has a rolled rim 14 which rests in contact with the pan. The cover or hood 11 is somewhat smaller in diameter than the diameter of the pan 10, to provide a surrounding space designated 15. The top of the cover or hood 11 where it joins the nozzle 13 is crinkled or corrugated, as at 16. These crinkles or corrugations are disposed radially with respect to the vertical axis of the nozzle 13, to provide means raised from the general surface of the top of the cover or hood on which an article to be sterilized may rest. In Fig. 1 there is shown a canning jar J resting on these corrugations 16. The lower edge of the jar will be elevated and the spaces between the corrugations 16 will provide passages 17 for the water of condensation which may run back into the pan on the outside surface of the cover or hood 11, and the passages 17 will also allow steam to escape from the jar after leaving the upper end of the nozzle 13 in the sterilizing action.

From the foregoing it will be obvious that there has been described elements which may be combined to practice a simple method for sterilizing articles of the character mentioned in the home. In this connection it is to be understood that the pan will contain a suitable quantity of water, after which the accessory A may be arranged in the pan 10. The pan and associated accessory may be arranged on a suitable heater or stove to heat the water for the purpose of producing steam. When steam issues from the nozzle 13, the articles to be cleaned or sterilized, one at a time may be arranged over the nozzle 13 so as to rest on the corrugations 16. The steam issuing from the nozzle 13 will clean the interior surface of the jar while the steam rising from the pan space 15 will clean the exterior surface thereof. In this manner the jar will be thoroughly sterilized.

I claim:

In combination, an open-topped water container having a circular bottom and a wall extending upwardly from the circumference of said bottom, a hood of sheet material having a smooth rim of substantially the same diameter as said bottom and adapted to engage the inside of the container adjacent said circumference of the bottom, said hood also having a wall extending upwardly for a substantial distance from said rim and diverging from said container wall when the rim is so engaged with the container, a horizontal portion integral with said hood wall and forming the top of the hood, said hood wall being imperforate for a substantial distance downwardly from said top, a single nozzle disposed centrally of said top and extending upwardly therefrom and communicating with an opening in said top, said top extending outwardly from said nozzle a substantial distance to form a support for the neck of a jar placed over said nozzle, the metal of said top adjacent the nozzle having a plurality of deformed parts forming projections and recesses on the upper and lower surfaces of the top, the projections on said upper surface being so located as to engage and support said jar neck and the recesses on said lower surface communicating with said nozzle.

BERTRAM J. SMYTH.